July 19, 1938.   J. H. H. VOSS   2,124,323
RING PLATE VALVE
Filed April 7, 1937
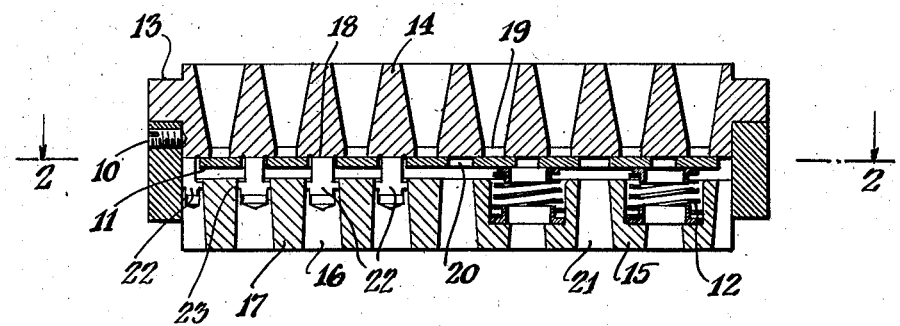
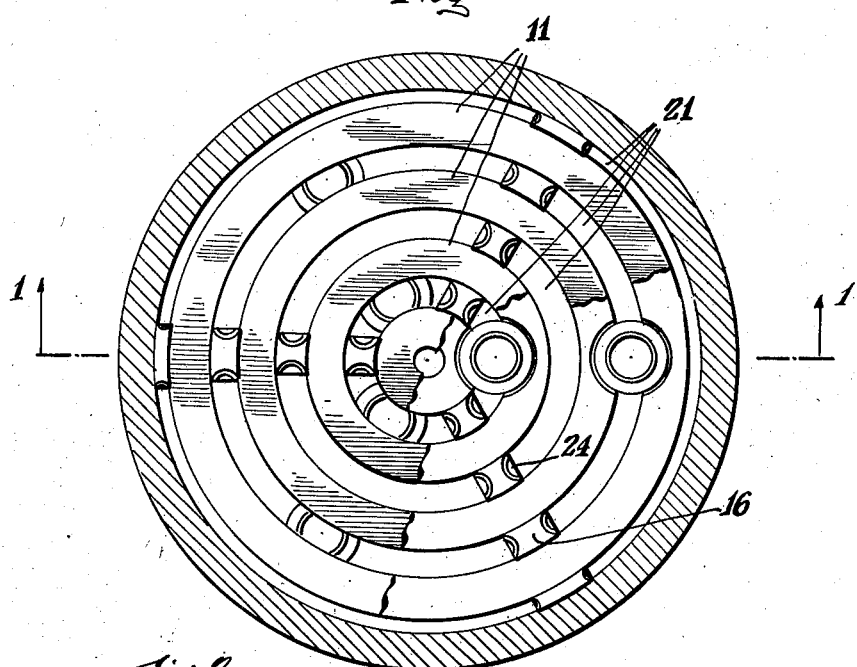
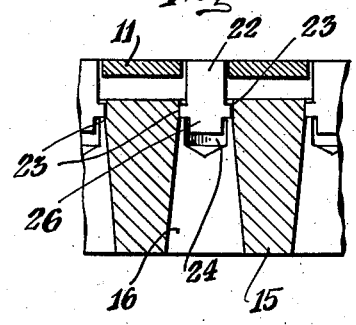
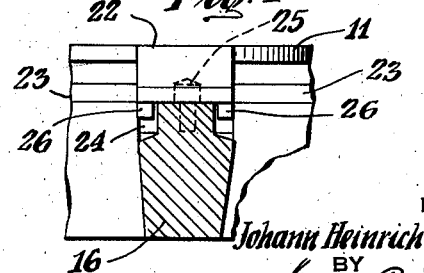
INVENTOR
Johann Heinrich Hermann Voss
BY
ATTORNEY Patented July 19, 1938

2,124,323

UNITED STATES PATENT OFFICE 2,124,323

RING PLATE VALVE

Johann H. H. Voss, White Plains, N. Y.

Application April 7, 1937, Serial No. 135,473

3 Claims. (Cl. 277—60)

This invention relates to improvements in automatic ring plate valves, particularly to such valves as, for instance, described in my Patent No. 2,035,776 of March 31, 1936, in which the moving valve plates consist of thin, flat, and individual ring plates which are held in closed position over circular ports in the valve seat by spring action and are opened by the flowing medium.

In the well known valves of this type operating difficulties are often caused by the wear and tear on the guide lugs which are made in one piece with the valve guard, and hold the valve plates in concentrical position over the circular port openings in the valve seat.

In high speed compressor valves the guide surfaces of these lugs are worn away quite rapidly through the continuous rubbing by the valve plates.

Worn guide lugs cause a shift in the position of the valve plates so that the port opening is uncovered and the valve does not hold tight.

It is the primary object of this invention to provide removable guide lugs so that the valve guard can have a simple flat surface and becomes easy to make. In my Patents No. 1,958,219 issued May 8th 1934, and No. 2,035,776, issued March 31, 1936, I have called attention to the necessity of providing proper guidance for the valve plates over their seats, and the necessity of very careful machine work especially on the valve guard to provide proper guidance for the valve plates and flat abutment surfaces in the valve guard. In the latter patent removable guide lugs are shown, but these are attached to a cylindrical spring housing. This spring housing with the attached guide lugs is comparatively expensive to make especially for small high speed valves in which narrow valve plates are used.

I therefore provide according to this invention separate guide lugs which are fitted over the connecting ribs of the concentrical abutment surfaces of the valve guard.

These new removable guide lugs are very cheaply manufactured by cutting them from a machined ring of the required cross-section and produced by plain turning and grinding. The heat treated lugs are simply placed into the valve guard between machined circular surfaces of adjacent wall section and are locked in place so that they cannot move from their position in any direction, by providing proper grooves in the valve guard and seat, yet the lugs can be replaced at a very small cost.

Other objects and advantages of my invention will become more fully known as the description thereof proceeds and will then be more specifically defined in the appended claims.

In the accompanying drawing forming a material part of this disclosure:

Fig. 1 is a central sectional elevation of the ring plate valve according to my invention equipped with removable guide lugs, the section being taken on line 1—1 of Figure 2.

Fig. 2 is a section on line 2—2 of Figure 1.

Fig. 3 is a fragmentary detail view showing the arrangement of the removable guide lugs in front elevation.

Fig. 4 is a view similar to Figure 3 with the lug seen at an angle of 90° and in side elevation.

As illustrated, the valve casing consists of two sections registering on their periphery in a rim and shoulder engagement secured with a plurality of set screws 10, with the valve plates 11 and their springs 12 housed between them and with appropriate external surfaces or collars 13 whereby the assembled parts may be clamped into a compressor structure. Both casing sections are, or may be, simple castings, the section marked 14 forming the valve seat, and the other, marked 15, being the valve guard having ribs 16 connecting the circular wall sections 17.

For a multi-ported valve of the kind here shown the seating part 14 has a surface 18 with a plurality of concentrical circular port slots 19 of proper width suited to the circular contour of the structure.

The upper or inner ends of all, these port slots terminate at the common seat surface 20 for the valve plates 11, which surface is a plane and hence easily produced in its finished form by ordinary tools. The valve guard section is formed with flow slots 21, similar in their concentrical arrangement to the port slots 19, but offset relatively thereto so that when the sections are united, the walls or ribs 16 between the said flow slots are disposed in a staggered position over the port slots 19.

The parts so far described are identical with those disclosed in my above mentioned patent.

According to the present invention, the removable guide lugs 22 for spacing two adjoining valve plates are fitted between machined grooves 23 located on the top of the connecting ribs 16 in the valve guard 15, and between the concentrical wall sections 17. The guide lugs 22 are locked against lateral movement by means of dowels 25 and by undercut flanges 26 engaging depressions 24 between adjacent wall sections, so that the valve plates 11 are properly spaced and are securely held in place over their respective port holes.

It will be clear that by the provision of the removable guide lugs which can be cheaply made by cutting them from a machined ring of the required cross-section and produced by plain turning and cutting, and which are fitted over the connecting ribs of the concentrical abutment surfaces of the valve guard and securely held thereon, the valve plates will always be properly spaced while the valve seats are always held in their proper relation to their respective port holes.

It will be understood that I have disclosed the preferred form of my invention as one example only to practically construct the same and that I may make such changes in its general arrangement and in the construction of the minor details thereof, as come within the scope of the appended claims without departure from the spirit of my invention and the principles involved.

Having thus described my invention, what I claim as new and desire to secure by Letters Patent is:

1. A plate valve mechanism comprising a multi-ported seat section, plate valves cooperating with said ports, a guard member having a section for each valve plate, ribs interconnecting said sections, said ribs having grooves therein, removable lugs each having portions projecting into said grooves and having another portion projecting between adjacent plates for guiding said plates, and means for retaining said lugs in position.

2. A plate valve mechanism comprising a multi-ported seat section, plate valves cooperating with the ports of said seat section, a guard member having flow slots concentrically arranged but offset relatively to the ports of said seat section, ribs between said flow slots interconnecting said sections, said ribs having grooves therein, removable lugs each having portions projecting into said grooves and another portion projecting between adjacent plates for guiding said plates, and means for retaining said lugs in position.

3. A plate valve mechanism comprising a multi-ported seat section, plate valves cooperating with said ports, a guard member having a section for each valve plate, ribs interconnecting said sections and disposed in staggered relation to said port slots in the seat section, said ribs having grooves therein, removable lugs each having portions projecting into said grooves and having another portion projecting between adjacent plates for guiding said plates, and dowel pins for retaining said lugs in position.

JOHANN H. H. VOSS.